DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 5, 1976

951 O.G. 7

T951,004

REARVIEW MIRROR SYSTEM

William A. Devlin, Jr., Farmington Hills, Mich., assignor to Ford Motor Company, Dearborn, Mich.

Continuation of abandoned application Ser. No. 402,673, Oct. 2, 1973. This application Aug. 11, 1975, Ser. No. 603,910

Int. Cl.[2] G02B 5/10

U.S. Cl. 350—302

1 Sheet Drawing. 12 Pages Specification

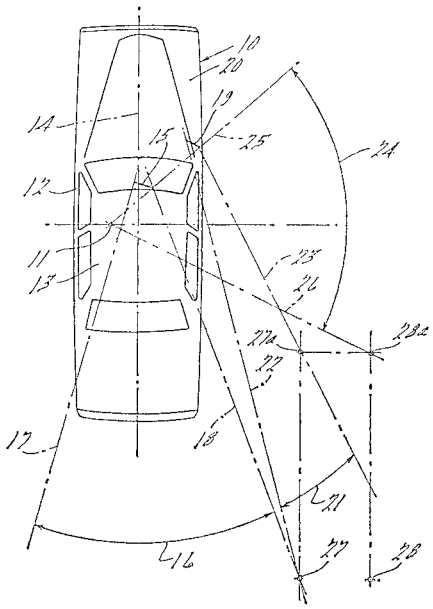

A rearview mirror system for surveillance from a first vehicle of a second vehicle overtaking the first vehicle in a lane to the right of the lane in which the first vehicle is traveling. The mirror system utilizes the field of view to the rear of the vehicle of a plane mirror mounted interiorly of the vehicle, the field of view to the side of the vehicle of a convex mirror mounted exteriorly of the vehicle, and the peripheral field of view of the vehicle operator as he looks toward the convex mirror from his seating reference point.

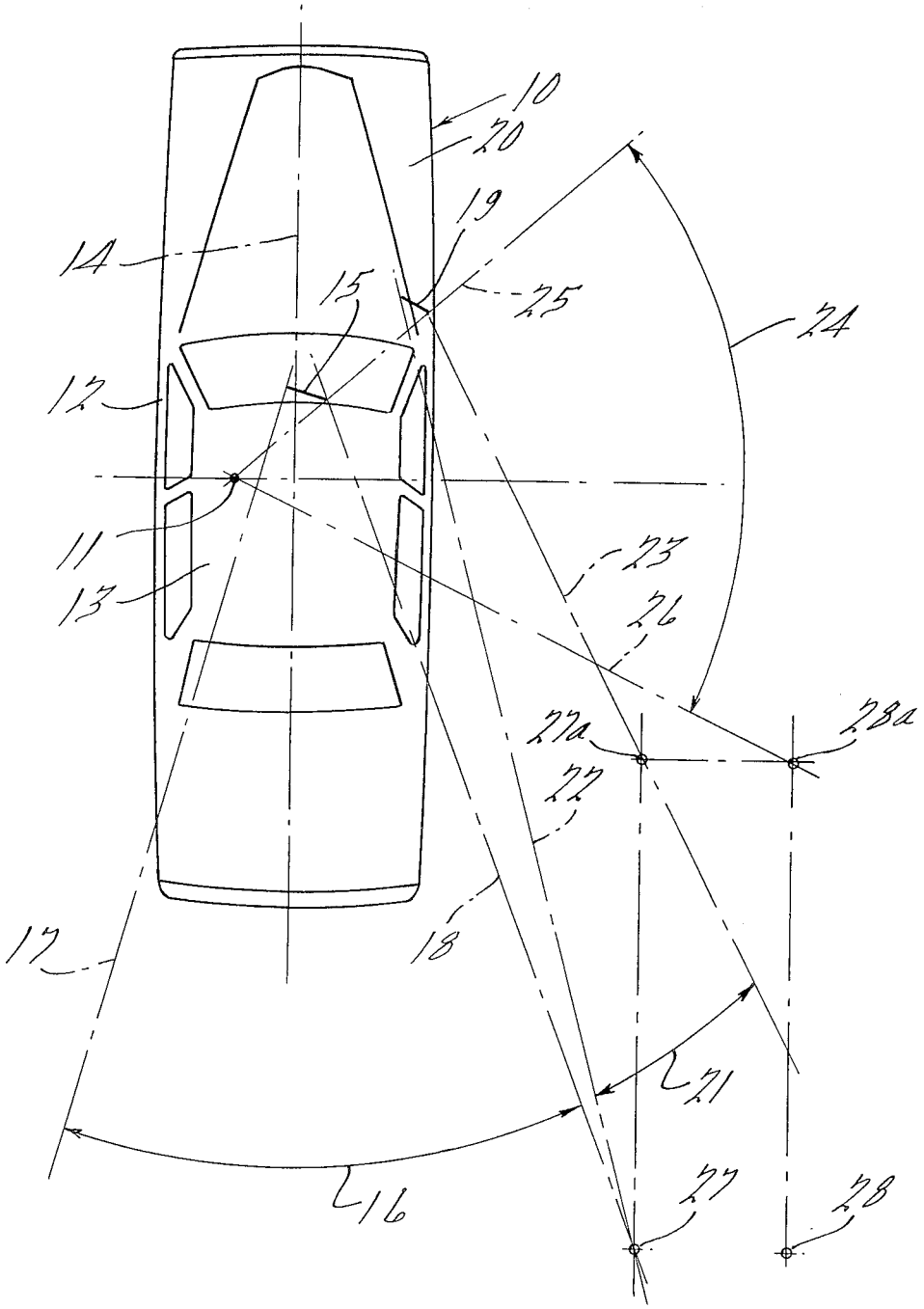

Oct. 5, 1976
W. A. DAVLIN, Jr.
REARVIEW MIRROR SYSTEM
Original Filed Aug. 11, 1975
T951,004